United States Patent
Smith et al.

(10) Patent No.: US 6,470,493 B1
(45) Date of Patent: Oct. 22, 2002

(54) COMPUTER METHOD AND APPARATUS FOR SAFE INSTRUMENTATION OF REVERSE EXECUTABLE PROGRAM MODULES

(75) Inventors: Sharon Lea Smith, Mountain View, CA (US); David Paul Hunter, Mountain View, CA (US); Robert Cohn, Nashua, NH (US); David W. Goodwin, San Jose, CA (US); Paul Geoffrey Lowney, Concord, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/410,388

(22) Filed: Sep. 30, 1999

(51) Int. Cl.$^7$ ................................................. G06F 9/45
(52) U.S. Cl. ..................... 717/130; 717/129; 717/131; 717/152; 717/153; 717/154; 717/155; 717/156; 717/157; 717/158; 717/159; 712/243; 712/244; 714/34; 714/35; 714/38; 714/39
(58) Field of Search ................................. 717/124, 127, 717/129, 133, 132, 130, 152–159, 131; 712/243, 244; 714/34, 35, 33, 37, 38, 39

(56) References Cited

U.S. PATENT DOCUMENTS

| 5,539,907 | A | | 7/1996 | Srivastava et al. ........... 395/700 |
|---|---|---|---|---|
| 5,732,273 | A | | 3/1998 | Srivastava et al. ........... 395/704 |
| 5,926,832 | A | * | 7/1999 | Wing et al. .................... 703/23 |
| 5,966,537 | A | * | 10/1999 | Ravichandran ............. 717/158 |
| 6,081,665 | A | * | 6/2000 | Nilsen et al. ................ 717/116 |
| 6,293,712 | B1 | * | 9/2001 | Coutant ....................... 712/228 |
| 6,327,699 | B1 | * | 12/2001 | Larus et al. ................. 717/128 |
| 6,327,704 | B1 | * | 12/2001 | Mattson et al. ............. 712/234 |
| 6,339,832 | B1 | * | 1/2002 | Bowman-Amuah ......... 710/266 |

FOREIGN PATENT DOCUMENTS

JP          2000020320 A * 1/2000 ............. G06F/9/45

OTHER PUBLICATIONS

Steven et al., "Using a Resource–Limited Instruction Scheduler to Evaluate The iHARP Processor", IEEE, pp.: 23–31, Jan. 1995.*
Sinha et al., "Analysis of Programs With Exception–Handling Constructs", IEEE, pp.: 1–10, Nov. 1998.*
Le, "An Out–of–Order Execution Technique for Runtime Binary Translators", ACM, pp.: 151–158, Oct. 1998.*
Johnson, "Some Requirement for Architectural Support of Software Debugging", ACM, pp.: 140–148, 1982.*
Goodenough, "Exception Handling: Issues a Proposed Notation", ACM, pp.: 683–696, Dec. 1975.*
Vo et al., "Xept: A Software Instrumental Method for Excepting Handling", IEEE pp.: 60–69, 1997.*
IBM Technical Disclosure Bulletin, "Handling Error Exception from Source Program", vol. 35, No. 1A, pp.: 23–24, Jun. 1992.*

* cited by examiner

Primary Examiner—Tuan Q. Dam
Assistant Examiner—Ted. T. Vo
(74) Attorney, Agent, or Firm—Hamilton, Brook, Smith & Reynolds, P.C.

(57) ABSTRACT

Computer method and apparatus allows instrumentation of program modules while maintaining exception-handling unwinding context. In the case of instrumenting procedure prologues, the invention preserves the calling context. A sanitized copy of the prologue and rewind instructions to reverse the effects of duplicate prologue instructions are employed.

5 Claims, 4 Drawing Sheets

14 prologue code

| | | |
|---|---|---|
| lda sp,-N(sp) | (stack pointer adjust) | 21 |
| stq r1, 0(sp) | (stack calling context) | |
| stq r2, 8(sp) | | |
| ... | | |
| stq rx, z(sp) | | | main body code   23
...

21 instrumented prologue code

| | |
|---|---|
| lda sp,-N(sp) | 1 |
| stq r1, 0(sp) | 2 |
|     lda sp,-M(sp) | i1 |
|     stq a0, 0(sp) | i2 |
|     bsr analysis | i3 |
|     lda sp, M(sp) | i4 |
| stq r2, 8(sp) | 3 |
| ... | |
| stq rx, z(sp) | 4 |

25 main body code   23
...

FIG. 2B

COMPUTER METHOD AND APPARATUS FOR SAFE INSTRUMENTATION OF REVERSE EXECUTABLE PROGRAM MODULES

BACKGROUND OF THE INVENTION

A computer application (i.e., program) is formed of a series of instructions referred to as "lines of code". Initially, these instructions are written in a human readable programming language, e.g., Fortran, C++, etc. This is referred to as the program source code. A compiler transforms the source code into machine readable code. It is the machine readable code, or a binary image of the same, that is the executable form (by a digital processor) of the application program.

To assist in debugging or analyzing a program, certain additional machine readable lines of code called instrumentation points are desired to be inserted into the executable image. At these specified points, new procedure invocations are introduced into the program. Instrumented programs are executed in the same manner as the original program, with the new procedures being invoked at the instrumented points in the program. These new procedures, or analysis routines, provide, for example, the values of parameters at the instrumentation point in the program, the number of times a procedure in the program is called, and other information about certain parts of the program. To that end, the new procedures/analysis routines of the instrumented program provide the capability for debugging and other types of analysis of the program. When executed, the instrumented application produces the desired type of analysis action as it runs.

Instrumentation points are allowed at procedure boundaries, basic block boundaries and/or instruction boundaries. Introducing binary instrumentation into the prologue code (initialization portion) of a procedure is a difficult problem. The primary issue is that if prologue code is used as an exception-handling mechanism for unwinding the stack frame, the introduction of other instructions into the prologue may compromise or break exception handling.

In the Atom and NT-Atom (both by Digital Equipment Corporation of Maynard, Mass.) instrumentation frameworks, the ability to properly instrument the prologue is a fundamental requirement for doing simulated performance studies. The current method that Atom utilizes on Tru64 Unix is to insert instrumentation code directly in the prologue potentially breaking exception handling of instrumented Tru64 applications. The current released version of NT-Atom does not instrument the prologue of any routine, thus guaranteeing that exception handling will operate properly.

SUMMARY OF THE INVENTION

Thus there is need for a technique which allows binary instrumentation of prologue code in program procedures while preserving the exception-handling's mechanism for unwinding the procedures stack frame. Such is the object of the present invention.

The present invention provides a method and apparatus to safely insert instrumentation code into the prologue of a procedure. The invention works with programming models that respond to exceptions or unwinding mechanisms by reverse executing the prologue code. Reverse execution of the prologue returns the state of the program to a condition that it was prior to the execution of the procedure.

The invention method introduces binary instrumentation into a procedure's prologue by duplicating components of the prologue and then instrumenting the original version of the prologue. The non-standard prologue instructions are preserved in the original sequence of instrumented prologue instructions. The net effect is that exception handling is preserved and the full prologue with non-standard instructions can be instrumented and executed without altering the program's intended behavior.

In the preferred embodiment, the method includes the steps of: (a) identifying a portion of the subject program into which insertion of instrumentation code is desired; (b) duplicating the identified portion such that a working copy of the identified portion is formed, said duplicating including placing the working copy before the identified portion; (c) removing instructions from the working copy such that only instructions necessary to restore calling context remains; (d) instrumenting the identified portion; and (e) enabling the working copy for use during reverse execution of the subject program and otherwise effecting use of the instrumented identified portion in the subject program.

Further, rewind instructions are inserted between the working copy and the original identified portions to reverse the effect of duplicated instructions in the identified portion. Preferably, working constructs (i.e., pointers) are set such that the working copy serves as an entry point and the original identified portion is effectively part of the main body of a program module.

Apparatus of the present invention includes an instrumentation assembly coupled to an instrumentation coder. The instrumentation assembly effects steps (a), (b), (c) and (e) of the foregoing method. The instrumentation coder effects step (d). Preferably, the instrumentation coder follows techniques of U.S. Pat. Nos. 5,539,907 and 5,732,273.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A–2B are schematic views illustrating instrumentation of a procedure prologue.

DETAILED DESCRIPTION OF THE INVENTION

Figure 1:
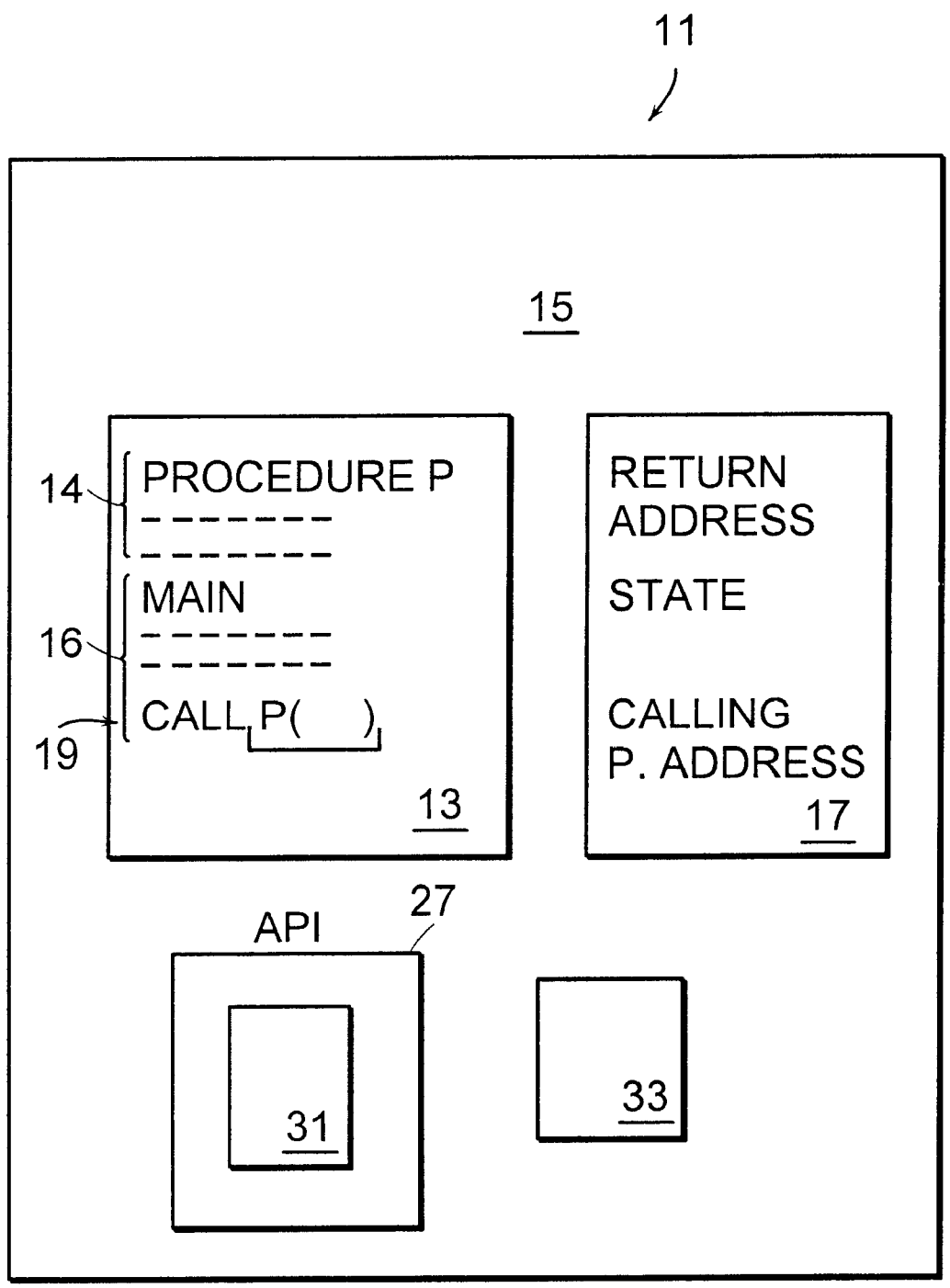
FIG. 1 is a block diagram of a computer processor assembly embodying the present invention.

Illustrated in FIG. 1 is a digital processor 11 holding the binary code of an application program 13 in working memory 15. Typically, the binary code 13 comprises a plurality of modules. Each module is formed of several to thousands of lines of instructions. Shown is a procedure module 14 and a main body module 16 in which there is a call 19 to the procedure module 14. During execution, one instruction after another in the main body 16 of the subject program 13 is processed. When the call instruction 19 is reached, the procedure module (indicated in the call instruction) is invoked.

Invocation of the procedure model 14 involves initializing a stack frame 17 to store the calling context. That is, memory address of the calling instruction 19 is saved/recorded on the stack frame 17, as is the return address (i.e., memory location to which to continue processing after the called procedure module) and other information required to restore the procedure calling context. Lastly, initial values of the procedure module variables are assigned using parameters passed into the called procedure module 14 via the call instruction 19. This sets the initial state of the procedure module 14.

The digital processor 11 then processes one instruction after the other in the procedure module 14.

In the case of an exception that is not processed in the immediate context of the procedure, the digital processor 11 reverse executes a current subject module one instruction at a time. This is referred to as "unwinding". The stack frame is used in the exception handling of a procedure 14 to unwind to the point/state where the procedure module 14 was invoked and originally called. That is, the state data stored in the stack frame 17 is used to return variables to the state at which the procedure module 14 was invoked/called. The calling address is used to backtrack to the call instruction 19 in the main body 16 of the subject program 13 that called the procedure module 14. Further unwinding of the procedure prologue associated with program body 16 may then be enabled.

Being supported by stack frames 17, pointers and similar stored memory address information, the backtracking or unwinding is fairly certain and stable. It is the altering of the program code 13 with additional adjustments to the stack frame pointer and other memory address changing instructions during instrumentation of the prior art that causes unwinding to fail. Thus, as previously mentioned, exception handling becomes problematic in instrumented programs of the prior art.

Referring back to FIG. 1, an instrumentation assembly 31 of the present invention is also stored in processor memory. Instrumentation assembly 31 provides instrumentation of program 13 before and/or after (e.g., outside of) execution runs in working memory 15 as detailed later in FIG. 4.

More specifically, the procedure module 14 is formed of a prologue portion 21 and main procedure body portion 23, as illustrated in FIG. 2A. The prologue portion 21 contains the instructions for initializing the stack frame with calling context information and state data. As shown in FIG. 2B, during instrumentation (outside of execution), it is desirable to insert into the procedure prologue 21 a series of instructions that adjust the stack frame, save information onto the stack, branch to an analysis routine and then restore the stack frame pointer to its former position. Such a branch instruction and associated analysis routine enable monitoring of state values, counting of the number of times the procedure module has been invoked, and other measuring of program operation.

When prior art instrumentation has inserted a branch (or other memory address changing) instruction 25 in the prologue 21, the exception-handling unwinding process breaks down as follows. Invocation and initialization of the procedure 14/prologue is as before. Processor 11 processes one instruction after another sequencing through prologue 21. As shown in FIG. 2B, an "lda" instruction is processed, followed by a "stq" instruction, etc. If an exception is invoked in the body of the procedure that requires unwinding the procedure, then the processor 11 proceeds to unwind reverse execute and effectively undo each reversible instruction in the prologue 21. That is, processor 11 reverse executes each of the store instructions 4 and 3. Then processor 11 attempts to adjust the stack pointer at instruction i4. This and subsequent adjustments to the stack pointer (i1 and regular prologue instruction 1) result in an over adjustment of the stack that breaks the unwinding mechanism.

In the present invention, instrumentation of the prologue 21 is performed in a manner that preserves, in proper sequence, the instructions in the prologue needed for unwinding. This is accomplished as follows and illustrated in FIGS. 3 and 4. Referring to FIGS. 1 and 4, an API (application program interface) 27 provides an interactive user interface for instrumenting program 13. In response to user request to insert instrumentation code into the prologue 21 of procedure module 14, instrumentation assembly 31 locates the binary code (step 41 in FIG. 4) for the designated prologue 21 and makes a copy (step 43) into scratch memory 33.

With the scratch memory copy, the instrumentation assembly 31 assesses each instruction for unwinding purposes. That is, if a subject instruction in the scratch memory copy is not necessary for the unwinding process, then at step 45 the instruction assembly 31 deletes that instruction from the scratch memory 33 copy of the prologue. As such, the instrumentation assembly 31 sanitizes the scratch memory copy of prologue 21 and only the instructions necessary for restoring the calling context during unwinding handling remain in the prologue copy at scratch memory 33.

Next, for each instruction remaining in the resulting prologue copy (in scratch memory 33), the instruction assembly 31 generates a corresponding rewind or reverse effect of that instruction (step 47), if required. The generated rewind instructions are appended to the prologue copy in scratch memory 33. The final contents of the scratch memory 33 are inserted before the original prologue 21 in the subject program binary code 13 in working memory 15 (FIG. 1).

At step 49 the instruction assembly 31 redefines beginning and ending boundaries of the original prologue 21 to be set to (i.e., point to) the copy of the prologue that came from scratch memory 33. The new rewind instructions from step 47 are seen as part of the main body 23 of the procedure 14 along with the original prologue instructions.

Instrumentation of the original prologue 21 (step 51) is then enabled and effected in accordance with U.S. Pat. No's. 5,539,907 and 5,732,273, or the like.

Figure 3:
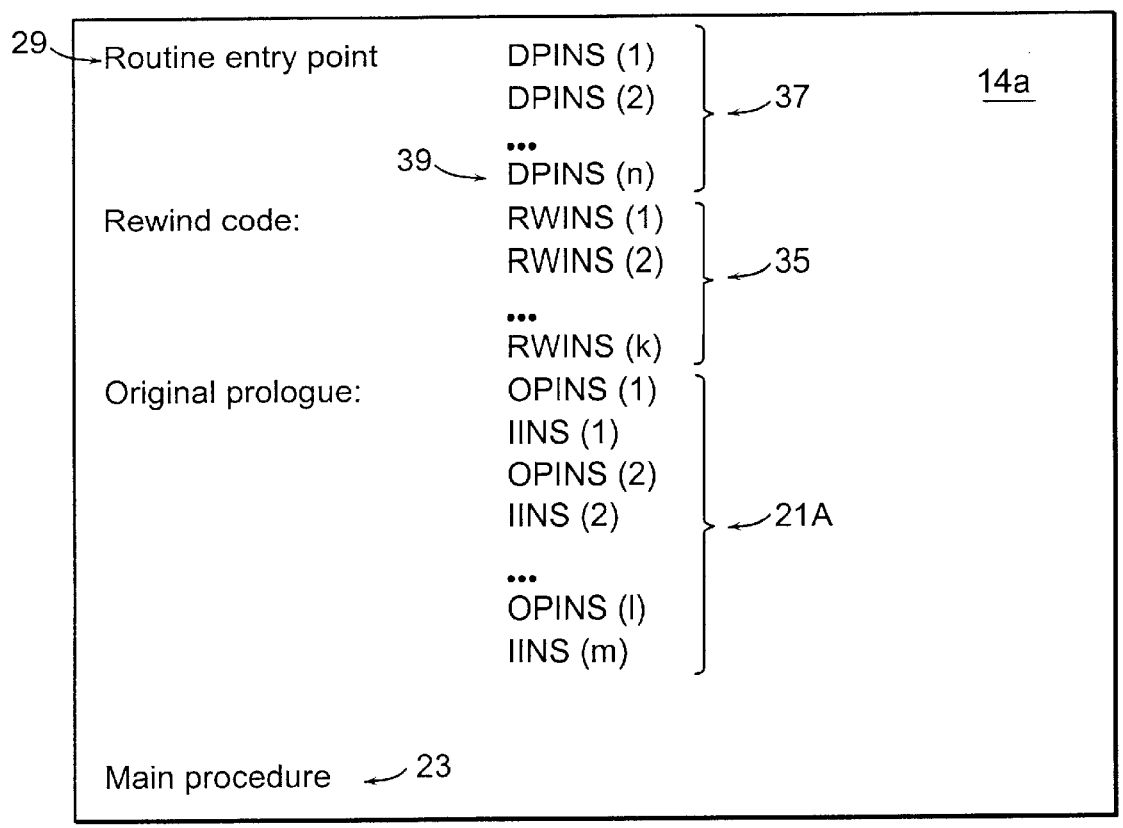
FIG. 3 illustrates a prologue implemented according to the invention.
Figure 4:
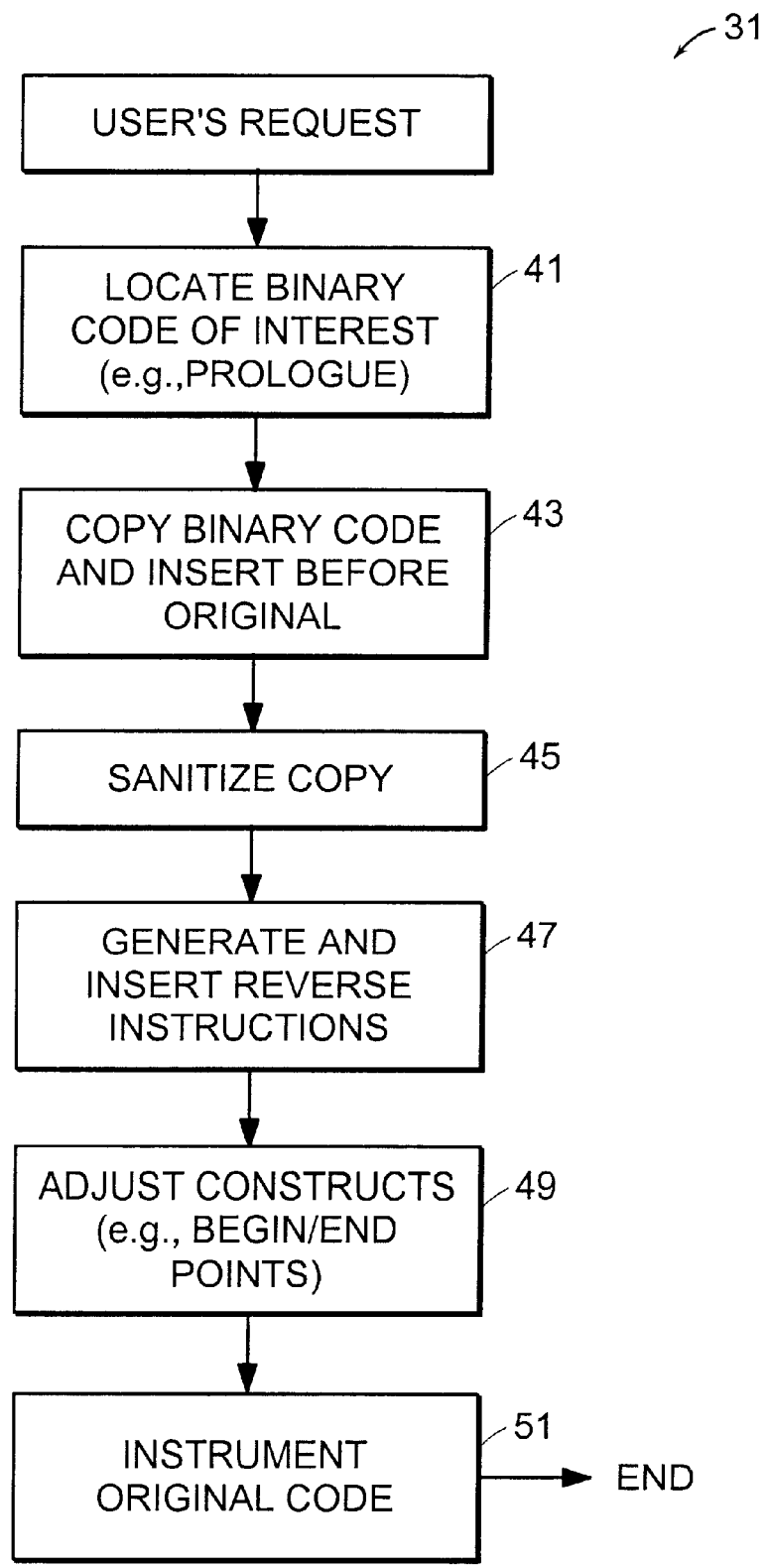
FIG. 4 is a block diagram outlining the steps of the invention method.

FIG. 3 illustrates prologue 21 instrumented according to the present invention. The duplicate and sanitized version of the prologue is at 37, i.e., instructions at DPINS (1) . . . DPINS (n). The beginning point or entry point to the now instrumented procedure module 14a is at 29 and an ending point prologue and procedure main body is set at 39. This effectively poses the DPINS (1) . . . (n) instructions at 37 as the prologue of instrumented procedure 14a. The rewind instructions from step 47 (FIG. 4) are at 35 and indicated as RWINS (1) . . . RWINS (k). The original prologue instructions (OPINS (1) . . . OPINS (1)) with desired instrumentation instructions (IINS (1) . . . IINS (m)) inserted are at 21a in FIG. 3. The original procedure 14 is at 23. The combination of code at 21a, 35 and 23 is as the body of main procedure body for instrumented procedure 14a.

That is, during execution, the processor 11 effectively executes the prologue instructions twice, the first time at 37 without instrumentation and the second time at 21a with instrumentation. The duplicate prologue instructions 37 are seen as the official prologue of the instrumented procedure 14a from the viewpoint of the procedure descriptor and the unwinding mechanism. The original prologue instructions at 21a are considered part of the procedure body along with the original procedure body 23.

With regard to execution and exception handling, the processor 11 processes DPINS instructions 37 one at a time as the prologue of the invoked procedure 14a. Next, the processor 11 processes the main body of the procedure 14a starting with the RWINS instructions 35. If an exception is invoked, the exception-handling rewinding begins at the set ending boundary 39 of what is seen as the official prologue 37 but is the duplicate or prologue copy from scratch memory 33 (FIG. 1). Where this version of the prologue 37 does not contain any instrumentation code and fully preserves the calling context, the unwinding mechanism succeeds in reverse executing the then apparent prologue 37.

To that end, the present invention enables the instrumentation of prologue code in a manner such that in cases where an exception occurs which causes the unwinding of the calling context to occur, the call chain is maintained.

While this invention has been particularly shown and described with references to preferred embodiments thereof, it will be understood by those skilled in the art that various changes in form and details may be made therein without departing from the scope of the invention encompassed by the appended claims.

For example, instead of copying the prologue (or program module to be instrumented) into scratch memory 33, prologue instructions may be copied directly into the subject binary program. Similarly, the rewind instructions may be inserted directly into the binary program instead of appended in scratch memory.

Further, the foregoing has discussed instrumentation of a procedure prologue. Other program modules may be similarly instrumented using the above-described techniques/steps of the present invention.

What is claimed is:

1. A method for inserting binary instrumentation code into a binary image of a subject program, comprising the steps of:

identifying a portion of the subject program into which insertion of instrumentation code is desired, the identified portion including an original prologue of a program procedure;

duplicating the identified portion such that a working copy of the identified portion is formed, said duplicating including placing the working copy before the identified portion;

removing instructions from the working copy such that only instructions necessary to restore calling context remains;

instrumenting the identified portion; and enabling the working copy for use during exception handling of the subject program and otherwise effecting use of the instrumented identified portion in the subject program.

2. A method as claimed in claim 1 further comprising the step of providing reverse instructions for reverse effecting the working copy of the identified portion.

3. A method as claimed in claim 1 wherein the step of enabling the working copy includes setting constructs such that the working copy serves as a prologue and the original prologue is executed as part of a main body of the program procedure.

4. Computer apparatus for inserting binary instrumentation code into a binary image of a subject program, comprising:

an instrumentation assembly responsive to user request for inserting instrumentation code into a desired portion of the subject program, the desired portion including an original prologue of a program procedure; the instrumentation assembly (a) locating the desired portion of the subject program, (b) copying the desired portion such that a working copy of the desired portion is formed, (c) placing the working copy before the desired portion in the subject program, (d) removing instructions from the working copy such that only instructions necessary to restore calling context remain, and (e) inserting instructions in the subject program to reverse effect the instructions remaining in the working copy; and an instrumentation coder coupled to the instrumentation assembly for instrumenting the desired portion, the instrumentation assembly further enabling the working copy for use during exception handler unwinding of the subject program and otherwise effecting use of the instrumented desired portion in the subject program.

5. Computer apparatus as claimed in claim 4 wherein the instrumentation assembly further sets constructs such that the working copy effectively serves as the prologue and the original prologue is treated as part of a main body of the program procedure.

* * * * *